Jan. 16, 1951 H. A. GOODE 2,538,093
PLOW
Filed Dec. 9, 1946 3 Sheets-Sheet 1
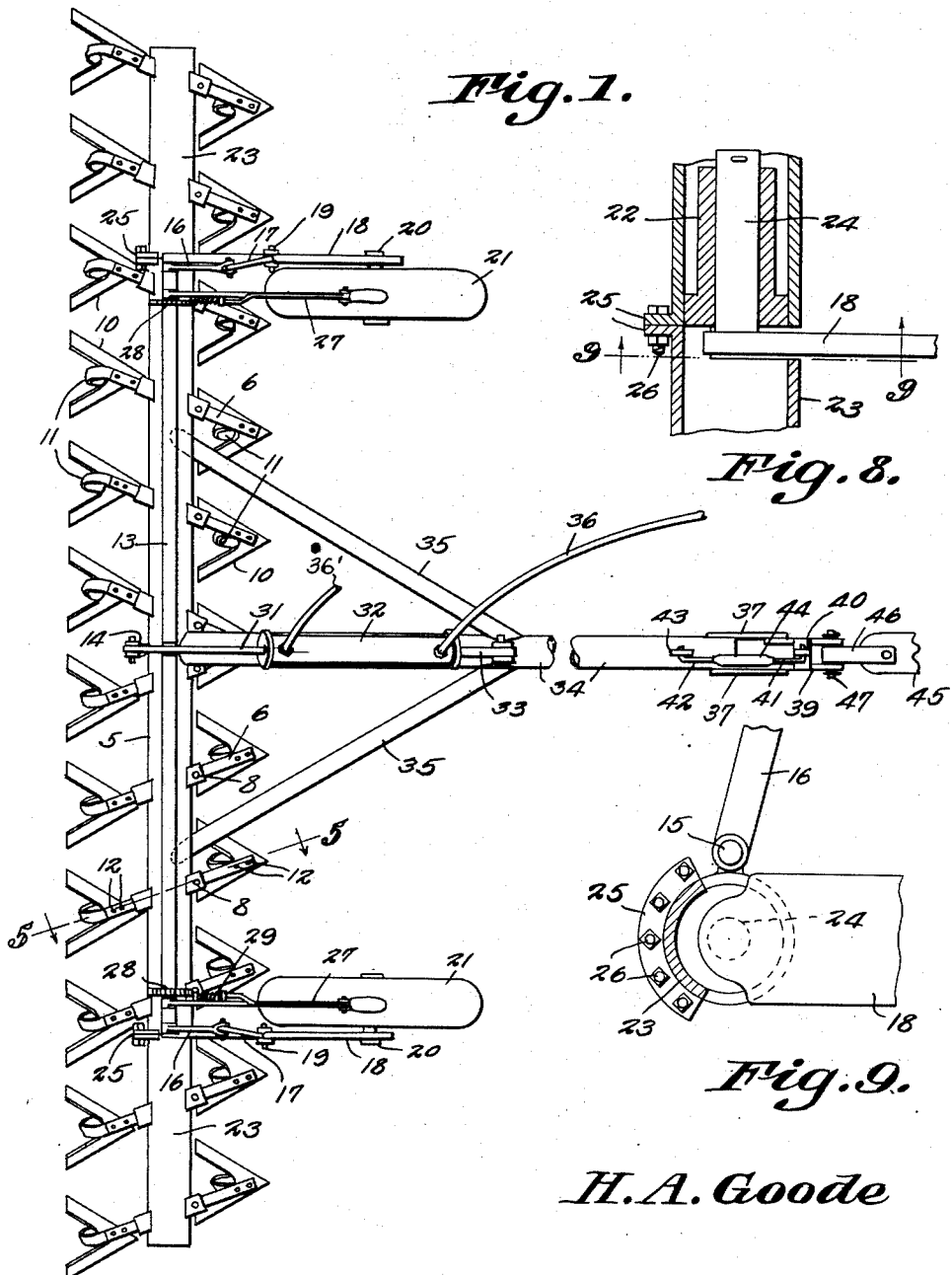
H. A. Goode
INVENTOR
BY C. A. Snowles.
ATTORNEYS.

Jan. 16, 1951 H. A. GOODE 2,538,093
PLOW
Filed Dec. 9, 1946 3 Sheets-Sheet 2
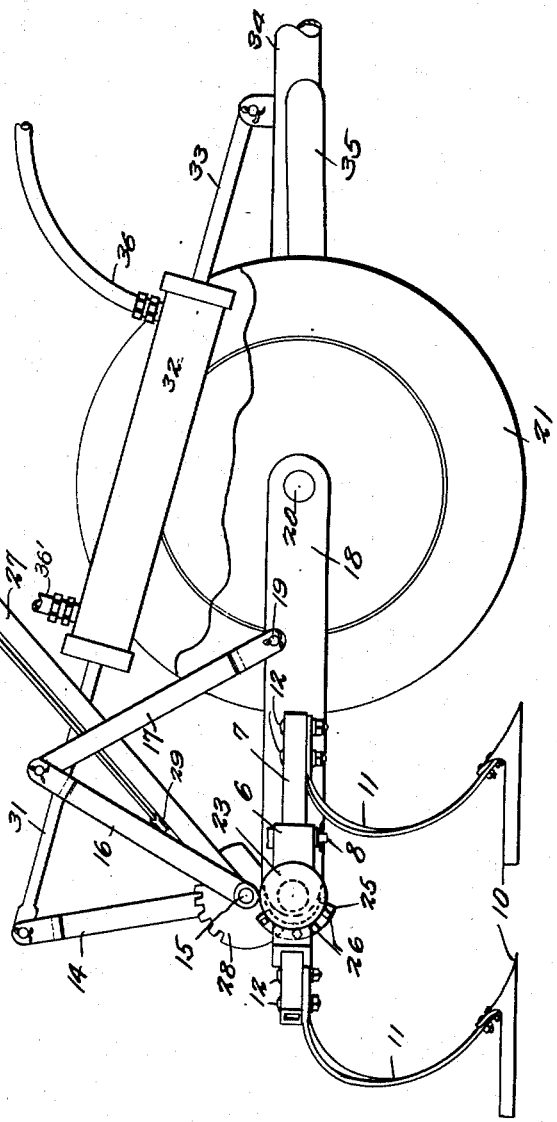
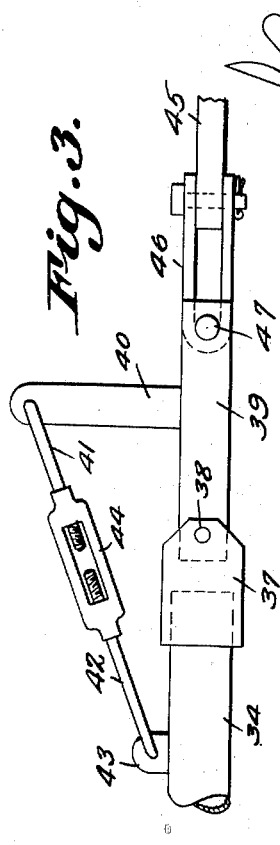
H. A. Goode
INVENTOR
BY C. A. Snow & Co.
ATTORNEYS.

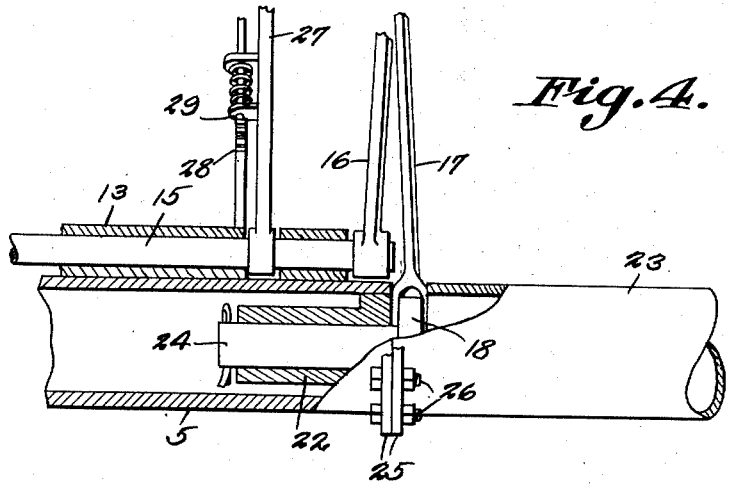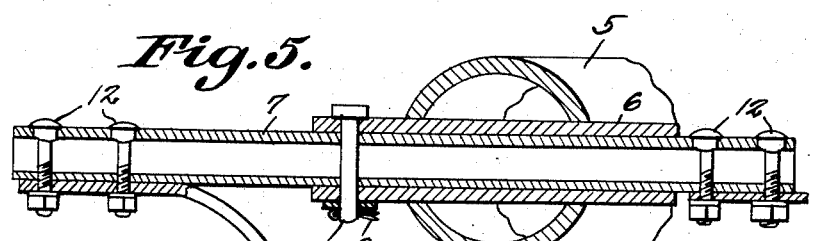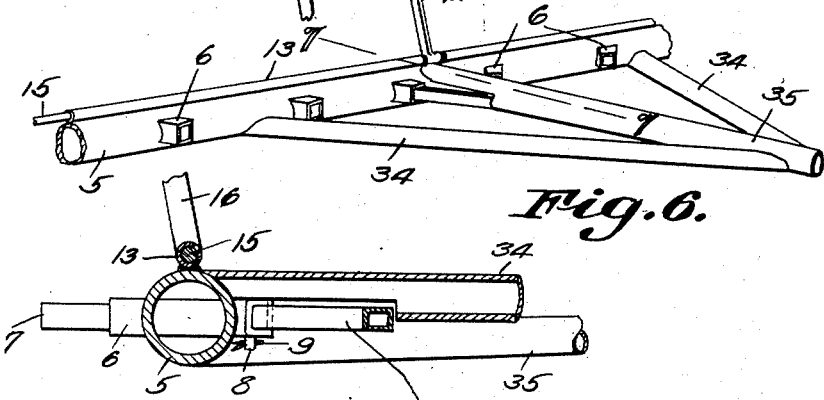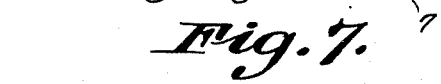

Patented Jan. 16, 1951

2,538,093

UNITED STATES PATENT OFFICE 2,538,093

PLOW

Henry A. Goode, Booker, Tex.

Application December 9, 1946, Serial No. 714,957

2 Claims. (Cl. 97—165)

This invention relates to agricultural machines and particularly to agricultural machines of the gang plow type.

An important object of the invention is to provide a gang plow having adjustable end sections, which may be used in lengthening the plow frame to increase the work capacity of the plow.

Another object of the invention is to provide a gang plow wherein the main plow beam and plows thereof are moved vertically into and out of operation, by means of a cylinder and piston operating within the cylinder, thereby to relieve the operator of undue labor, necessary for adjusting the usual wheels of machines of this character.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a plan view of a gang plow constructed in accordance with the invention.

Figure 2 is an enlarged end sectional view of the gang plow.

Figure 3 is an enlarged elevational view, illustrating the tractor hitch, by means of which the machine is hitched to a tractor.

Figure 4 is a fragmental enlarged elevational view illustrating the manner of attaching the extension to the ends of the main bar of the gang plow frame.

Figure 5 is a sectional view taken on line 5—5 of Figure 1.

Figure 6 is a fragmental perspective view illustrating the main hitch beam and hitch beam braces of the machine.

Figure 7 is a sectional view taken substantially on line 7—7 of Figure 6.

Figure 8 is a fragmental enlarged sectional view, illustrating the manner of attaching the wheel arms to the ends of the main bar of the gang plow frame.

Figure 9 is a sectional view taken substantially on line 9—9 of Figure 8.

Referring to the drawings in detail, the machine comprises a frame including a main plow beam 5, the beam 5 being preferably tubular in formation, presenting a curved outer surface to prevent weeds, or other foreign matter from collecting thereon, while the machine is moving over a field.

The main beam 5 is formed with a plurality of openings which are extended therethrough, the openings being so arranged that the tubes 6, which are extended therethrough, have their ends disposed at oblique angles with respect to the front and rear edges of the plow beam 5, as clearly shown by Figure 1 of the drawings.

These tubes 6 are preferably rectangular in formation and provide rectangular openings for the reception of the beams 7 that are also rectangular in formation, to prevent the beams 7 from turning when the machine is in operation. The tubes 6 are preferably welded in the openings of the main plow beam 5 to secure them in position.

The beams 7 are formed with openings that register with openings of the tubes 6, for the reception of securing pins 8 that are shown as extended therethrough, the securing pins being held in place by means of cotter keys 9, providing means whereby the pins may be readily and easily removed, should it be desired to remove or replace a damaged beam 7.

The beams 7 are of lengths so that their front and rear ends extend appreciable distances beyond the ends of the tubes 6, where they provide supports for the plow sweeps or blades 10, the plow sweeps or blades 10 being secured to the beams 7 by means of the shanks 11, which connect with the plow sweeps or blades, and which are also connected to the beams 7, by means of the bolts 12.

Thus it will be seen that due to this construction, the plow sweeps or blades 10 of the rear row of sweeps or blades, are disposed in staggered relation with respect to the plow sweeps or blades of the front row, to the end that the surface throughout the entire width of the body portion of the gang plow, will be treated by the plows as the machine moves thereover.

Secured to the upper surface of the main beam 5, and extending longitudinally thereof, are tubular members 13, the tubular members having their adjacent inner ends spaced apart, providing a clearance for one end of the arm 14, which is shown as disposed therein, the arm 14 having its lower end connected with the control rod 15, which is of a length to extend beyond the outer ends of the tubular members 13.

Secured to the outer ends of the control rod 15, are links 16, which have pivoted connection with the links 17, that in turn have their lower ends pivotally connected to the arms 18 at 19.

The arms 18 extend forwardly and have axles 20 disposed at their forward ends, on which the wheels 21 operate, the rear ends of the arms 18 being connected with the pivot pins 24 that operate in the bearings 22, mounted in the ends of the main plow beam 5.

In order to secure the extensions to the ends of the main plow beam, the ends of the main plow beam, as well as the inner ends of the extensions 23, are formed with annular flanges 25 that have openings for the reception of the bolts 26. These extensions 23 carry additional plow sweeps or blades, the number being regulated by the length of the extensions, to meet the requirements of use.

Connected to the control rod 15 at points adjacent to the ends thereof, are hand levers 27, which may be operated to rotate the control rod manually, to raise and lower the wheels 21, to move them into and out of operation and to hold them after adjustment, segments 28 are disposed adjacent to the pivoted ends of the levers 27, and cooperate with latches 29 in securing the hand levers in various positions of adjustment.

Also connected with the control rod 15 at a point intermediate its ends, is the arm 14, which extends upwardly therefrom, the arm 14 being connected with the piston rod 31, that operates in the cylinder 32 supported on the rod 33, which in turn is secured to the main hitch bar 34, at a point adjacent to the angular brace bars 35 that also connect with the main plow beam 5.

Connected with one end of the cylinder 32, is an air hose 36 leading from a suitable source of compressed air supply, the discharge of the air through the hose 36 being controlled by a suitable valve, not shown. Thus it will be seen that when it is desired to lower the gang plow, air pressure is directed to the forward end of the cylinder 32, through the hose 36. When it is desired to elevate the gang plow, air pressure is directed to the interior of the cylinder 32 through the hose 36' at the rear end thereof, forcing the piston, not shown, forwardly, the piston being carried at one end of the rod 31, rotating the control rod 15, which swings the links 16 and 17 forwardly, moving the arms 18 downwardly, and moving the wheels 21 into contact with the ground surface elevating the gang plows. The plow sweeps or blades 10 are now elevated to a position spaced above the ground surface.

The invention also includes a novel form of hitch, which embodies plates 37, mounted on opposite sides of the front end of the hitch bar 34, the plate 37 being preferably welded to the main hitch bar 34.

The plates are formed with openings to receive the pin 38, that also passes through the bar 39, pivotally connecting the bar 39 with the plates.

Extending upwardly from the bar 39, is an arm 40 to which one end of the turn buckle rod 41 is connected, the opposite turn buckle rod 42 being connected with the ear 43 that rises from the main hitch bar 34. By operating the turn buckle 44 to the left or right, the arm 40 may be adjusted with respect to the ear 43, should it be desired to elevate or lower the front end of the gang plow frame, to adjust the angle of operation of the plow sweeps or blades. The hitch bar 45 connects with the tractor, and also connects with the link 46 that connects with the bar 39 at 47.

From the foregoing it will be seen that I have provided a gang plow which may be moved over a field, the plow sweeps or blades contacting with that portion of the field between the ends of the frame or main beam.

It will also be seen that the angle of operation of the blades may be readily and easily adjusted, to meet various requirements.

Having thus described the invention, what is claimed is:

1. An agricultural machine comprising a main hollow plow beam, plows mounted along the plow beam, bearings disposed in the ends of the plow beam, plow extension sections having openings, removably secured to the ends of the main plow beam with their openings adjacent to the ends of the main plow beam, wheel supporting arms extending into the openings of the extensions, pivot pins operating in said bearings and to which said wheel supporting arms are secured, stub axles extending from the free ends of the arms and on which supporting wheels are mounted, and means for raising and lowering said arms whereby the wheels are adjusted vertically, regulating the depth of operation of the plows on the plow beam.

2. An agricultural machine comprising a main hollow plow beam, plow blades mounted along the plow beam, elongated bearing members disposed within the hollow ends of the plow beam, curved flanges formed on the ends of the plow beam, plow extension sections having flanges cooperating with the flanges of the plow beam in securing the plow extension sections to the plow beam, said plow extension sections having openings formed in the side wall thereof adjacent to one end, wheel supporting arms extending into the openings, pivot pins to which the arms are secured, said pivot pins operating in the bearings, wheels mounted on the free ends of the arms, and means for pivoting the arms adjusting the wheels vertically whereby the depth of operation of said plows is regulated.

HENRY A. GOODE.

REFERENCES CITED

The following references are of record in the file of this patent:

UNITED STATES PATENTS

| Number | Name | Date |
|---|---|---|
| 1,148,088 | Heylman | July 27, 1915 |
| 1,460,578 | Fischer | July 3, 1923 |
| 1,526,972 | Ferguson | Feb. 17, 1925 |
| 1,711,485 | Bergeland | May 7, 1929 |
| 1,963,426 | Taylor | June 19, 1934 |
| 2,195,631 | Post et al. | Apr. 2, 1940 |
| 2,257,650 | Pfeifer et al. | Sept. 30, 1941 |
| 2,278,081 | Kramer | Mar. 31, 1942 |
| 2,430,223 | Goode | Nov. 4, 1947 |